(12) United States Patent
Hayano et al.

(10) Patent No.: US 7,999,888 B2
(45) Date of Patent: Aug. 16, 2011

(54) LIQUID CRYSTAL DISPLAY DEVICE HAVING PARTICULAR COLOR-FILTER ON ARRAY STRUCTURE

(75) Inventors: Takayuki Hayano, Matsusaka (JP); Dai Chiba, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 331 days.

(21) Appl. No.: 12/377,269

(22) PCT Filed: Apr. 19, 2007

(86) PCT No.: PCT/JP2007/058535
§ 371 (c)(1),
(2), (4) Date: Feb. 12, 2009

(87) PCT Pub. No.: WO2008/035482
PCT Pub. Date: Mar. 27, 2008

(65) Prior Publication Data
US 2010/0208178 A1 Aug. 19, 2010

(30) Foreign Application Priority Data
Sep. 19, 2006 (JP) .................. 2006-253534

(51) Int. Cl.
G02F 1/1335 (2006.01)
G02F 1/136 (2006.01)
G02F 1/1343 (2006.01)
(52) U.S. Cl. ........................... 349/106; 349/44; 349/146
(58) Field of Classification Search .................. 349/106, 349/44, 146
See application file for complete search history.

(56) References Cited

U.S. PATENT DOCUMENTS

| 6,671,025 B1 * | 12/2003 | Ikeda et al. ............... 349/156 |
| 7,826,011 B2 * | 11/2010 | Yang et al. ............... 349/106 |
| 2002/0060757 A1 | 5/2002 | Kiguchi et al. |
| 2004/0203180 A1 | 10/2004 | Kiguchi et al. |

FOREIGN PATENT DOCUMENTS

| EP | 1 331 511 | 7/2003 |
| EP | 1 674 924 | 6/2006 |
| JP | 2000-122072 | 4/2000 |
| JP | 2001-142064 | 5/2001 |
| JP | 2001-142095 | 5/2001 |
| JP | 2002-131735 | 5/2002 |
| JP | 2002-214425 | 7/2002 |
| JP | 2005-309147 | 11/2005 |

OTHER PUBLICATIONS

International Search Report for PCT/JP2007/058535 mailed May 15, 2007.

* cited by examiner

*Primary Examiner* — Mike Qi
(74) *Attorney, Agent, or Firm* — Nixon & Vanderhye, P.C.

(57) ABSTRACT

The present invention provides a liquid crystal display device having a color-filter on array structure, which can improve an aperture ratio and reduce connection defects. The present invention is a liquid crystal display device including the first substrate, the second substrate, and a liquid crystal layer interposed between the first and second substrates, the first substrate having a structure in which a lower conductive part, a color filter layer, an upper conductive part are stacked in this order on an insulating substrate, wherein the color filter layer includes a colored part and a partition for partitioning the colored part, the partition is formed in such a way that a plurality of openings and a coupling opening are formed, the colored part being arranged in the plurality of openings, the coupling opening linearly coupling the plurality of openings with each other, and the upper conductive part is connected to the lower conductive part through a contact hole, the contact hole being formed in a region overlapping with the coupling opening.

15 Claims, 11 Drawing Sheets

US 7,999,888 B2

LIQUID CRYSTAL DISPLAY DEVICE HAVING PARTICULAR COLOR-FILTER ON ARRAY STRUCTURE

This application is the U.S. national phase of International Application No. PCT/JP2007/058535 filed 19 Apr. 2007 which designated the U.S. and claims priority to Japanese Patent Application No. 2006-253534 filed 19 Sep. 2006, the entire contents of each of which are hereby incorporated by reference.

TECHNICAL FIELD

The present invention relates to a liquid crystal display device. More specifically, the present invention relates to a liquid crystal display device, in which a color filter is formed on an active matrix substrate by an injection apparatus such as an ink-jet apparatus.

BACKGROUND ART

A liquid crystal display device is a display device with low electrical power consumption and it can be lightened and thinned. Therefore, the liquid crystal display device has been widely used in a TV, a monitor for personal computers, a monitor for personal digital assistances, and the like. The liquid crystal display device which has been commonly used currently has a configuration in which liquid crystal is interposed between two glass substrates including electrodes and for sealing, a sealant is arranged at the edge of the both substrates. Plastic beads uniform in particle size are scattered as a spacer between the two substrates, and thereby a space between the two substrates is kept at a certain distance.

According to a liquid crystal display device for color display (color liquid crystal display device), on one of the above-mentioned two glass substrates, a color filter layer including colored parts of red (R), green (G), and blue (B), and a shielding layer (BM: BlackMatrix) partitioning the colored parts of R, G, and B is formed. Further, an active matrix driving color liquid crystal display device generally includes a TFT array substrate that is an active matrix substrate and an opposite substrate arranged to face the TFT array substrate. The TFT array substrate generally includes: a switching element such as a thin film transistor (TFT) including a semiconductor layer made of amorphous silicon (a-Si), polysilicon (p-Si) and the like; and a pixel electrode, a source bus line, and a gate bus line, each connected to the switching element. The opposite substrate generally includes an opposite electrode and a color filter layer. Then, a polarizer is arranged on each main surface of the both substrates in this display device. As a result, such a display device can display color images.

Examples of liquid crystal mode of the liquid crystal display device include TN (Twisted Nematic) mode, STN (Super Twisted Nematic) mode, GH (Guest Host) mode, ECB (Electrically Controlled Birefringence) mode, FLC (Ferroelectric Liquid Crystal) mode. In each mode, it is advantageous in terms of production of the display device that the color filter layer is arranged on the opposite substrate having a relatively simple electrode configuration. However, the opposite substrate and the active matrix substrate might be misaligned at the time of attachment. Therefore, the BM needs to have an opening smaller than an opening formed on the active matrix substrate. As a result, an aperture ratio is decreased.

In addition, a pixel needs to have a high aperture ratio in order to improve a luminance in the liquid crystal display device. In order to improve the aperture ratio of the pixel, a technology for providing a production facility which permits higher-precision alignment has been developed. However, according to a current production method, the improvement in aperture ratio, attributed to the improvement in alignment technology, is difficult.

A Color-filter on array (COA) structure in which a color filter layer is formed on an active matrix substrate has been currently developed. This structure needs no alignment at the time when an active matrix substrate including a color filter layer (COA substrate) is attached to an opposite substrate including an electrode over the entire surface thereof. Therefore, no misalignment defect in the attachment step is generated. Further, the production steps can be simplified as the alignment process is not needed. In addition, a problem in alignment accuracy at the time when the both substrates are attached to each other is not generated. Therefore, a pattern can be designed without taking the misalignment into consideration, and a BM pattern is formed to have a smaller width. As a result, the aperture ratio can be highly increased.

Various methods such as a staining method, a pigment dispersion method, an electrodeposition process, and a film transfer method have been developed as a method of forming the color filter having the COA structure. According to a conventional COA structure, the respective colored parts of R, G, and B are formed in a layer between a switching element formed on the lower layer side and a pixel electrode formed on the upper layer side. Therefore, a contact hole is formed in the respective colored parts, and thereby the pixel electrode needs to be conducted to the switching element through this contact hole. Accordingly, if this color-filter on array structure is formed by the production method of the color filter, how to form the contact hole in the respective colored parts is important.

A method of producing the colored parts of the color filter layer with an ink-jet apparatus (hereinafter, also referred to as an "ink-jet method") has been actively developed. This method has advantages such as simple production processes and low production costs. However, formation of the COA structure using the ink-jet method has a problem in how to form the above-mentioned contact hole. That is, no photomask is used in the ink-jet method, and therefore, the colored parts of R, G, and B are generally made of a material without photosensitivity. Hence, a photolithography process can not be used to form a contact hole in the color filter layer.

Under such a circumstance, the following methods have been proposed. A method of forming a through-hole in a switching element region of a light-shielding layer (for example, refer to Patent Document 1); and a method of providing an opening of a partition (also serving as an BM) with a projection, and inhibiting an ink from intruding into the projection by utilizing a surface tension of the ink, thereby using this projection as a contact hole (for example, refer to Patent Document 2). However, according to these methods, a BM-remaining part and a BM-removed part exist on a line joining one opening to another opening through the contact hole. As a result, the BM pattern needs to have a certain width, and therefore, the high aperture ratio, which is a merit of the COA structure, can not be provided. According to the method utilizing the surface tension of the ink, the ink intrusion might not be sufficiently suppressed depending on a material for the ink, and a connection defect between the switching element and the pixel electrode is generated in certain instances. Thus, there is room for improvement in these conventional technologies in order to improve the aperture ratio and suppress the generation of the connection defects.

[Patent Document 1]
Japanese Kokai Publication No. 2000-122072
[Patent Document 2]
Japanese Kokai Publication No. 2002-131735

DISCLOSURE OF INVENTION

The present invention has been made in view of the above-mentioned state of the art. The present invention has an object to provide a liquid crystal display device having a color-filter on array structure, which can increase an aperture ratio and reduce connection defects.

The present inventors made various investigations on a liquid crystal display device having a color-filter on array (COA) structure, which permits an improvement in aperture ratio and a reduction in connection defects. The inventors noted the following method of forming a contact hole. A contact hole is formed in a region where ink intrusion has been inhibited by utilizing a surface tension of an ink containing a material for the colored part. Further, the inventors found that the aperture ratio can be improved if a partition (bank) which stems an ink and partitions the respective colored parts is formed in such a way that a plurality of openings where each colored part is formed and a coupling opening which linearly couples the plurality of openings with each other are formed; and an upper conductive part such as a pixel electrode is connected to a lower conductive part such as a switching element through the contact hole formed in the coupling opening. Further, the inventors found that the connection defects can be reduced if the partition is formed in such a way that a plurality of openings and a bent opening connected to one or more of the plurality of openings are formed and the upper conductive part is connected to the lower conductive part through a contact hole formed in the bent opening. As a result, the above-mentioned problems have been admirably solved, leading to completion of the present invention.

That is, the present invention is a liquid crystal display device including the first substrate, the second substrate, and a liquid crystal layer interposed between the first and second substrates, the first substrate having a structure in which a lower conductive part, a color filter layer, an upper conductive part are stacked in this order on an insulating substrate, wherein the color filter layer includes a colored part and a partition for partitioning the colored part, the partition is formed in such a way that a plurality of openings and a coupling opening are formed, the colored part being arranged in the plurality of openings, the coupling opening linearly coupling the plurality of openings with each other, and the upper conductive part is connected to the lower conductive part through a contact hole, the contact hole being formed in a region overlapping with the coupling opening (hereinafter, also referred to as "the first liquid crystal display device of the present invention"). According to this embodiment, the partition which is arranged for forming the opening (coupling opening) in which the contact hole is formed can be formed to have a smaller width. Therefore, the aperture ratio can be increased in the liquid crystal display device having a COA structure.

The first liquid crystal display device of the present invention is mentioned below in more detail.

The above-mentioned lower conductive part is a conductive part which is closer to the insulating substrate than the upper conductive part. The lower conductive part is not especially limited. Examples thereof include a switching element, a wiring, and an electrode. Among these, a switching element is preferable. If the lower conductive part is a switching element, a part where the switching element is connected to the upper conductive part is not especially limited. More specifically, an electrode constituting the switching element, a part extended from the electrode constituting the switching element, a wiring or another electrode connected to the electrode constituting the switching element, and the like, are preferable.

The above-mentioned upper conductive part is a conductive part that is positioned on the upper layer side of the lower conductive part (on the side opposite to the insulating substrate of the lower conductive part). The upper conductive part is not especially limited, and the pixel electrode, the wiring, and the like may be mentioned. Among these, the pixel electrode is preferable. The above-mentioned upper conductive part may be connected to the lower conductive part through a contact hole which is formed to overlap with the coupling opening when the liquid crystal display device is viewed in the front direction.

If the above-mentioned lower conductive part is a switching element and the upper conductive part is a pixel electrode, the pixel electrode is generally connected to a drain electrode of the switching element or a part extended from the drain electrode of the switching element (drain wiring), through the above-mentioned contact hole.

In view of high-definition display image, the above-mentioned first substrate is preferably a so-called active matrix substrate in which pixels are arrayed in a matrix pattern. Further, the above-mentioned first substrate preferably has a structure in which a switching element, a color filter layer, and a pixel electrode are stacked. Such a substrate is suitable for the liquid crystal display device having a COA structure. The above-mentioned second substrate generally includes a common electrode (opposite electrode), but includes no color filter layer.

In the present description, the phrase "as viewed in plane" means "when the substrate main surface is viewed in the front direction", and the term "planar shape" means a shape observed as viewed in plane.

The planar shape of the above-mentioned partition is not especially limited, and it may be appropriately determined in view of layout of the switching element, the wiring, and the like. According to the above-mentioned partition, the openings which are coupled through the coupling opening are formed to have a shape constricted at the coupling opening. According to this embodiment, the ink intrusion from the openings into the coupling opening can be effectively suppressed by utilizing a surface tension of the ink that is a material for the colored part. In addition, the partition may have a rounded corner as viewed in plane because the above-mentioned partition is generally formed of a photosensitive material by a photolithography process.

The above-mentioned "the coupling opening linearly couples the plurality of openings with each other" does not always mean that a coupling opening which has a strictly linear planar shape couples the plurality of openings with each other. There is no need to take a resolution of a material for the partition into consideration. The above-mentioned partition may be formed in such a way that a plurality of openings where the colored part is arranged and a coupling opening which substantially linearly couples the plurality of openings with each other are formed.

The first liquid crystal display device of the present invention may or may not include other components as long as it includes these components essentially.

Preferable embodiments of the first liquid crystal display device of the present invention are mentioned below in more detail.

It is preferable that the coupling opening has a square shape as viewed in plane. If the planar shape of the coupling opening has a square shape that is a very simple shape, the width of the partition can be more decreased at the position where the coupling opening is formed. As a result, the aperture ratio can be further increased. The above-mentioned square shape is not necessarily strictly square shape. There is no need to take a resolution of the material for the partition into consideration. The above-mentioned coupling opening may have a substantially square shape as viewed in plane.

The arrangement embodiment of the above-mentioned coupling opening is not especially limited. The following embodiment is preferable. According to the following embodiment, the first liquid crystal display device having a COA structure of the present invention can be easily provided while the effects of the present invention are exhibited. That is, an embodiment in which the coupling opening couples openings in adjacent pixels with each other (hereinafter, also referred to as "the first embodiment") is preferable. Further, an embodiment in which the partition is formed in such a way that a plurality of openings in one pixel are formed, and the coupling opening couples at least two of the plurality of openings in one pixel with each other (hereinafter, also referred to as "the second embodiment") is preferable.

According to the above-mentioned first embodiment, the adjacent pixels can be generally pixels adjacent in the horizontal direction and those adjacent in the vertical direction when the display surface of the liquid crystal display device is viewed in the front direction. According to an embodiment in which a capacitance wiring constituting a storage capacitance is arranged to run through the center of the pixel in the horizontal direction, i.e., a Cs on Common embodiment, it is more preferable that the coupling opening couples openings in pixels adjacent in the horizontal direction. This is because, according to the Cs on Common embodiment, it is difficult that coupling openings in pixels adjacent in the vertical direction while light leakage from the coupling opening in which the contact hole is formed is prevented and the switching element is shielded with a shielding partition. According to an embodiment in which a gate wiring is used as a wiring constituting a storage capacitance, i.e., a Cs on Gate embodiment, it is more preferable that the coupling opening couples openings in pixels adjacent in the vertical direction with each other. This is because, according to the Cs on Gate embodiment, the contact hole is generally arranged above the gate wiring.

The above-mentioned second embodiment is preferably applied to a liquid crystal display device including the first substrate in which a capacitance wiring is arranged not at the periphery of the pixel but at the inner region of the pixel. That is, it is more preferable that the first substrate includes a capacitance wiring formed at the inner region of the pixel, and the coupling opening is arranged to overlap with the capacitance wiring. The above-mentioned first substrate may include a capacitance wiring which is formed to run through the inner regions of adjacent pixels, and the coupling opening may be arranged to overlap with the capacitance wiring when the liquid crystal display device is viewed in the front direction.

It is preferable that the coupling opening has a width of 20 μm or less at a boundary between the coupling opening and the opening. More preferably, the width is 10 μm or less. As a result, the intrusion of the ink that is a material for the colored part into the coupling opening can be effectively inhibited, and the lower conductive part and the upper conductive part can be more surely conducted to each other. The above-mentioned partition is generally formed of a photosensitive material by a photolithography process. The partition has a rounded corner as viewed in plane. Therefore, the above-mentioned coupling opening does not necessarily strictly have a width of 20 μm or less or 10 μm at the boundary between the coupling opening and the opening, and the width may be about 20 μm or less or about 10 μm or less at the boundary.

It is preferable that the coupling opening is arranged to overlap with a shielding member formed on the first substrate. As a result, generation of light leakage in the region where the coupling opening is formed can be effectively suppressed. The shielding member is not especially limited, but the wiring and the electrode are preferable. The above-mentioned coupling opening may be arranged to overlap with the shielding member formed on the first substrate when the liquid crystal display device is viewed in the front direction.

It is preferable that the colored part is formed of a nonphotosensitive material. If the colored part is formed of a non-photosensitive material, a photolithography method can not be used for forming the contact hole in the colored part. Therefore, the coupling opening is needed in addition to the opening where the colored part is formed. Thus, the present invention can be particularly preferably used when the colored part is formed of a nonphotosensitive material.

It is preferable that the colored part is formed with an injection apparatus. If the injection apparatus is used for forming the colored part, the colored part and the contact hole can be formed in the same step, and therefore, the production processes can be simplified. Examples of the injection apparatus include an ink-jet apparatus, a nozzle coater, and a dispenser. Among these, an ink-jet apparatus is preferably used. According to the ink-jet apparatus, the ink can be accurately injected and applied into a predetermined fine pattern, and the colored parts can be easily formed at low costs.

The present invention is also a liquid crystal display device including the first substrate, the second substrate, and a liquid crystal layer interposed between the first and second substrates, the first substrate having a structure in which a lower conductive part, a color filter layer, an upper conductive part are stacked in this order on an insulating substrate, wherein the color filter layer includes a colored part and a partition for partitioning the colored part, the partition is formed in such a way that an opening and a bent opening are formed, the colored part being formed in the opening, the bent opening being connected to the opening, and the upper conductive part is connected to the lower conductive part through a contact hole, the contact hole being formed in a region overlapping with the bent opening (hereinafter, also referred to as "the second liquid crystal display device of the present invention"). If the opening having a bent planar shape (the bent opening) is added, as the opening where the contact hole is formed, to the opening where the colored part is formed, the intrusion of the material for the colored part (ink) in the color filter layer-forming step can be more effectively suppressed and the area of the contact hole can be more increased in comparison to a conventional manner in which the opening is provided with the projection. Accordingly, in the liquid crystal display device having a COA structure, connection defects can be reduced.

The second liquid crystal display device of the present invention is mentioned below in detail.

The second liquid crystal display device of the present invention includes the first substrate, the second substrate, and the liquid crystal layer interposed between the first and second substrates. The first substrate has a structure in which the lower conductive layer, the color filter layer, and the upper conductive layer are stacked in this order. Thus, the second liquid crystal display device of the present invention has a COA structure similar to that in the first liquid crystal display device of the present invention. Similarly to the first liquid crystal display device of the present invention, according to the second liquid crystal display device of the present invention, a switching element is preferable as the above-mentioned lower conductive part and a pixel electrode is preferable as the upper conductive part. The above-mentioned first substrate is preferably a substrate having a structure in which a switching element, a color filter layer, and a pixel electrode are stacked. Further, an active matrix substrate is Preferable as the above-mentioned first substrate. An electrode extended from the switching element may be used as the above-mentioned lower conductive part. Thus, if the lower conductive part is used as a switching element, a part where the switching element is connected to the upper conductive part is not especially limited. More specifically, an electrode constituting the switching element, a part extended from the electrode constituting the switching element, a wiring or another electrode connected to the electrode constituting the switching element, and the like, are preferable. The above-mentioned upper conductive part may be connected to the lower conductive part through a contact hole which is formed to overlap with the bent opening when the liquid crystal display device is viewed in the front direction.

The above-mentioned planar shape of the partition is not especially limited. From the same viewpoint as in the first liquid crystal display device of the present invention, the above-mentioned partition generally has the following shape: the bent opening is substantially dendritically branched from the opening; or the openings coupled by the bent opening constricts at the bent opening. According to such an embodiment, the ink intrusion from the opening into the coupling opening can be effectively suppressed by utilizing a surface tension of the ink that is a material for the colored part in the step of forming the color filter layer. The above-mentioned partition is generally formed of a photosensitive material by a photolithography process, and therefore, the partition may have a rounded corner as viewed in plane.

The configuration of the second liquid crystal display device of the present invention is not especially limited. The second liquid crystal display device may or may not include other components as long as such components are essentially included.

Preferable embodiments of the second liquid crystal display device of the present invention are mentioned below in detail.

The planar shape of the above-mentioned bent opening is not especially limited. A substantially zigzag shape, a curved shape, a branched shape, and the like, may be mentioned. More specifically, if the bent opening is connected to one opening, it is preferable that the bent opening has an L or T shape in view of resolution of the material for the partition. That is, an embodiment in which the bent opening is connected to one opening, and the bent opening has an L shape or T shape as viewed in plane is preferable. According to this embodiment, a plurality of openings may be arranged in one pixel. That is, the numbers of the opening and the bent opening in one pixel are not especially limited as long as one bent opening is connected to only one opening. The above-mentioned L or T shape is not necessarily strictly L or T shape. The planar shape of the bent opening is as close to L or T shape as possible in view of resolution of the material for the partition. The above-mentioned bent opening is connected to one opening and the planar shape may be a substantially L or T shape.

The arrangement embodiment of the above-mentioned bent opening is not especially limited. The following embodiment is preferable. According to the following embodiment, the second liquid crystal display device having a COA structure of the present invention can be easily provided while the effects of the present invention are exhibited. That is, an embodiment in which the bent opening couples openings in adjacent pixels with each other (hereinafter, also referred to as "the third embodiment") is preferable. Further, an embodiment in which the partition is formed in such a way that a plurality of openings in one pixel are formed, and the bent opening couples at least two of the plurality of openings in one pixel with each other (hereinafter, also referred to as "the fourth embodiment") is preferable.

According to the above-mentioned third and fourth embodiments, it is preferable that the bent opening has a step shape, cross shape, or T shape as viewed in plane in view of resolution of the material for the partition. The above-mentioned step shape, cross shape, and T shape are not necessarily strictly those shapes, respectively. The planar shape of the bent opening is as close to step shape, cross shape, or T shape as possible in view of resolution of the material for the partition. The above-mentioned bent opening may have a substantially step shape, cross shape, or T shape as viewed in plane.

In the second liquid crystal display device of the present invention, the above-mentioned bent opening may have two or more different planar shapes on one substrate.

Similarly to the first liquid crystal display device of the present invention, according to the above-mentioned third embodiment, it is more preferable that the above-mentioned bent opening couples openings in pixels adjacent in the horizontal direction (Cs on Common) or in the vertical direction (Cs on Gate). It is more preferable in the above-mentioned fourth embodiment that the first substrate includes a capacitance wiring formed at the inner region of the pixel and that the coupling opening is arranged to overlap with the capacitance wiring. According to the above-mentioned fourth embodiment, the above-mentioned first substrate includes a capacitance wiring formed to run through the inner regions of adjacent pixels, and the coupling opening may be arranged to overlap with the capacitance wiring when the liquid crystal display device is viewed in the front direction.

From the same viewpoint in the first liquid crystal display device of the present invention, it is preferable that the bent opening has a width of 20 μm or less at a boundary between the bent opening and the opening. The width is more preferably 10 μm or less. It is preferable that the coupling opening is arranged to overlap with a shielding member formed on the first substrate. It is preferable that the colored part is formed of a nonphotosensitive material. The above-mentioned partition is generally formed by a photolithography process using a photosensitive material and it has a rounded corner as viewed in plane. The above-mentioned bent opening does not necessarily have a width of 20 μm (or 10 μm) or less at the boundary between the bent opening and the opening. The width of the bent opening may be about 20 μm (or about 10 μm) or less at the boundary between the bent opening and the opening. The above-mentioned coupling opening may be arranged to overlap with the shielding member formed on the first substrate when the liquid crystal display device is viewed in the front direction.

The embodiments mentioned in the first liquid crystal display device also can be appropriately applied to the second liquid crystal display device of the present invention.

EFFECT OF THE INVENTION

The liquid crystal display device of the present invention provides a color-filter on array structure which can improve an aperture ratio and reduce connection defects.

BEST MODES FOR CARRYING OUT THE INVENTION

The present invention is mentioned in more detail below with reference to Embodiments using drawings, but not limited to only these Embodiments.

Embodiment 1

FIG. 1 is a schematic view showing a liquid crystal display device in accordance with Embodiment 1. FIG. 1(a) is a planar view. FIG. 1(b) is a cross sectional view taken along line X1 to Y1 in FIG. 1(a). In the present description, each figure shows only one or two pixels because it is easy to see. However, a plurality of pixels are arrayed in the vertical and horizontal directions in each figure.

A liquid crystal display device 100 in the present Embodiment is an active matrix driving liquid crystal display device in TN mode. The liquid crystal display device 100 includes an active matrix substrate 10 that is the first substrate and an opposite substrate 40 that is the second substrate. The active matrix substrate (array substrate) 10 has the following structure on an insulating substrate 11. A source wiring 13 extended from a source electrode 21, a gate wiring 12 extended from a gate electrode 23, a capacitance wiring 14, a switching element 20 that is a lower conductive part, a pixel electrode 15 that is an upper conductive part, a color filter layer 30, are arranged in a matrix pattern. Further, the opposite substrate 40 includes a common electrode 42 on an insulating substrate 41. A liquid crystal layer 50 is interposed between the active matrix substrate 10 and the opposite substrate 40. A spacer (not shown) such as a plastic bead is arranged between the two substrates, and thereby a space between the two substrates is kept at a certain distance. An alignment film (not shown) is arranged on liquid crystal layer side surfaces of the active matrix substrate 10 and the opposite substrate 40, if necessary.

The switching element 20 is a thin film transistor (TFT), and it is configured to include the gate electrode 23, a gate insulating film 24, a semiconductor thin film 25, the source electrode 21, and a drain electrode 22. The switching element 20 is an inverted staggered TFT in which the gate electrode 23 is arranged closer to the insulating substrate 11 than the source electrode 21 and the drain electrode 22. The drain electrode 22 is extended to be above the capacitor wiring 14, and functions as an electrode constituting a storage capacitance Cs. That is, the liquid crystal display device 100 includes a so-called Cs on Common type storage capacitance. The drain electrode 22 is also referred to as a drain wiring.

The color filter layer 30 includes a partition 31 and colored parts 32a and 32b. The partition 31 is formed in a lattice pattern to cover the source wiring 13, the gate wiring 12, the storage capacitance 14, and the switching element 20. The colored parts 32a and 32b are formed in openings 33a and 33b that are regions surrounded by the partition 31. The color filter layer 30 is formed on an insulating film 16. The insulating film 16 is formed to cover the source wiring 13, the gate wiring 12, the capacitor wiring 14, and the switching element 20. The colored parts 32a and 32b are colored parts of the same color, and made of a resin containing a colorant of any one of red, green, and blue, for example. Thus, the color filter layer 30 includes the colored parts 32a and 32b arranged in each pixel, and the partition 31 arranged to partition the colored parts 32a and 32b in adjacent pixels. According to the present embodiment, the partition 31 is formed in such a way that two openings 33a and 33b in one pixel are formed.

In the color filter layer-forming step, the partition 31 is a projection which is formed in order to arrange the ink that is a material for the colored part in a desired region of each pixel. The partition 31 is also called bank. The partition 31 includes a shielding component and functions also as a shielding layer. According to such an embodiment, the switching element 20 can be prevented from improperly operating and the color display characteristics can be improved. In this case, the partition 31 is also called black matrix (BM).

In addition, the partition 31 is formed in such a way that an opening having a substantially linear shape as viewed in plane (coupling opening 34) which couples the opening 33a with the opening 33b is formed. That is, the coupling opening 34 linearly couples two openings 33a and 33b where the colored parts 32a and 32b are arranged respectively, with each other. The coupling opening 34 is provided with a contact hole 17. More specifically, the contact hole 17 is formed at a part which is positioned inside the coupling opening 34 of the insulating layer 16. The pixel electrode 15 formed on the colored parts 32a and 32b is connected to the drain electrode 22 of the switching element 20 through the contact hole 17. Thus, the coupling opening 34 is formed, and thereby the ink that is a material for the colored part shows a surface tension of the ink, and the ink intrusion into the contact hole 17 can be effectively suppressed.

An aperture ratio of the liquid crystal display device 100 is mentioned with reference to FIG. 2. FIG. 2 is a front (planar) view schematically showing an arrangement embodiment of the partition in accordance with Embodiment 1. FIG. 3 is a front (planar) view schematically showing an arrangement embodiment of the partition in accordance with Comparative Embodiments. FIG. 3(a) is a partition in accordance with Comparative Embodiment 1. FIG. 3(b) is a partition in Comparative Embodiment 2.

As shown in FIG. 2, according to the partition 31 pattern in the present Embodiment, only a partition 31-removed part 31a, that is, the coupling opening 34, exists on a straight line of the opening 33a, the contact hole 17, and the opening 33b. Accordingly, there is no need to take resolution of the material for the partition into consideration, and a width W1 of the partition 31 can be decreased. Therefore, the aperture ratio can be increased.

As shown in FIG. 3(a), according to Comparative Embodiment 1, the partition 31 is directly provided with a hole as the contact hole 17. According to such Comparative Embodiment 1, a partition 31-remaining part 31b, a partition 31-removed part 31a, and another partition 31-remaining part 31b exist on a straight line of the opening 33a, the contact hole 17, and the opening 33b. Accordingly, a width W2 of the partition 31 needs to be increased in view of resolution of the material for the partition. Therefore, the aperture ratio is smaller than that in Embodiments of the present invention. As shown in FIG. 3(b), according to Comparative Embodiment 2, the opening 33b of the partition 31 is provided with a projection 61 and the contact hole 17 is arranged at this projection 61. According to such Comparative Embodiment 2, the partition 31-removed part 31a and the partition 31-remaining part 31b exist on a straight line of the opening 33a, the contact hole 17, and the opening 33b. Accordingly, the aperture ratio is slightly improved as compared with that in Comparative Embodiment 1. However, taking resolution of the material for the partition into consideration, a width W3 of the partition 31 can not be decreased, and therefore, the improvement in aperture ratio has limitations.

The production method of the liquid crystal display device 10 is mentioned with reference to FIG. 4. FIGS. 4(a) to 4(c) are front (planar) views schematically showing the liquid crystal display device in accordance with Embodiment 1, and show production processes of the liquid crystal display device.

First, as shown in FIG. 4(a), using a common method, that is, a photolithography method in which film formation and etching are repeated, the TFT 20 including the gate electrode 23, the gate insulating film 24, the semiconductor thin film 25, the source electrode 21 and the drain electrode 22; the source wiring 13; the gate wiring 12; and the storage wiring 14 are formed on the insulating substrate 11 made of glass, plastic, and the like. The gate electrode 23 and the gate wiring 12 are integrally formed. Further, the gate electrode 23, the gate wiring 12, and the capacitance wiring 14 are formed of the same material in the same step. The source electrode 21 and the source wiring 13 are integrally formed. Further, the source electrode 21, the source wiring 13, and the drain electrode 22 are formed of the same material in the same step.

The insulating film 16 is formed over the entire surface of the insulating substrate 11 on which the TFT 20 and the like has been formed. Successively, the insulating film 16 is patterned by a photolithography method and the like to expose a part of the drain electrode 22 (a part overlapping with the capacitance wiring 14). Thus, the contact hole 17 is formed. Examples of the insulating film 16 include a passivation (Pas) film, films of inorganic oxides such as $SiO_2$, SiNx, and SiNO, a transparent organic film. A stacked body of these films may be used as the insulating film 16.

As shown in FIG. 4(b), a material for the partition, such as a black pigment-containing photosensitive resin, is applied and then exposed and developed, thereby pattern-forming the partition 31 on the insulating film 16. As a result, the openings 33a and 33b, and the coupling opening 34 are formed. The coupling opening 34 is formed in a region overlapping with the contact hole 17. Therefore, a part of the drain electrode 22 remains to be exposed. The material for the partition is not especially limited. An acrylic resin, a polyimide resin, an epoxy resin, and the like, are mentioned.

The partition 31 is irradiated with plasma under atmosphere of fluorine atom-containing gas, and thereby providing the partition 31 with ink repellency.

As shown in FIG. 4(c), an ink into which a pigment of R, G, or B has been dispersed is injected into the openings 33a and 33b with an ink-jet apparatus. The ink hardly intrudes into the coupling opening 34 because it generally has a surface tension. Successively, heat treatment, photoirradiation, and the like, are performed, by removing a solvent in the ink remaining inside the openings 33a and 33b. As a result, the ink is cured to provide the colored parts 32a and 32b.

Compositions of the R, G, and B inks are not especially limited, but inks having the following compositions are mentioned.

"Composition of R Ink"
Pigment (C.I. Pigment Red 254): 5 parts by weight
Polymer dispersant (product of Avecia Biologics Ltd., SOLSPERSE 24000): 2 parts by weight
Binder (benzyl methacrylate-methacrylic acid copolymer): 3 parts by weight
Monomer 1 (dipentaerythritol pentaacrylate): 2 parts by weight
Monomer 2 (tripropylene glycol diacrylate): 5 parts by weight
Initiator (2-methyl-1-[4-(methylthio)phenyl]-2-morpholino propane)-1-on): 2 parts by weight
Solvent (diethylene glycol monobutyl ether acetate, 29.9 dyn/cm): 81 parts by weight "Composition of G Ink"
G ink has the same composition as in the R ink, except that instead of the C.I. Pigment Red 254, C.I. Pigment Green 36 at the same amount is included.

"Composition of B Ink"
B ink has the same composition as in the R ink, except that instead of the C.I. Pigment Red 254, C.I. Pigment Blue 15:6 at the same amount is included.

Then, the pixel electrode 15 is pattern-formed using a transparent conductive film such as an ITO. A part of the drain electrode 22 overlapping with the contact hole 17 still remains to be exposed. Therefore, the pixel electrode 15 is connected to the drain electrode 22 through the contact hole 17. Then, an alignment film (not shown) made of polyimide is formed if necessary, and thereby the active matrix substrate 10 can be prepared.

The active matrix substrate 10 obtained in the above-mentioned step and the counter substrate 40 are arranged to face each other with a spacer (not shown) therebetween, and then, a sealant (not shown) is arranged at the edge of the both substrates, thereby attaching the substrates to each other, as shown in FIG. 1. The opposite substrate 40 includes the common electrode 42 made of a transparent conductive film such as an ITO, and if necessary, an alignment film (not shown) made of polyimide and the like, on the insulating substrate 41 made of glass, plastic, and the like. Then, the liquid crystal layer 50 is formed by filling a space between the two substrates with a liquid crystal material.

Finally, a polarizer-attaching step, a module-assembling step, and the like, are performed by common methods. As a result, the liquid crystal display device 100 is completed. Thus, according to the production method of the present Embodiment, the pixel electrode 15 can be easily connected to the switching element 20 without complicating the production steps.

According to the present Embodiment, the switching element 20 is not especially limited to the TFT. MIM (Metal-Insulator-Metal), a varistor and the like, may be used as the switching element 20. The liquid crystal mode is not especially limited to the TN mode. STN mode, GK mode, ECB mode, ferroelectricity mode, and the like, may be used as the liquid crystal mode. The combination of colors of the colored parts is not especially limited to R, G, and B. Cyan, yellow, magenta, and the like, may be mentioned. The combination may be consisted of four or more colors. The array embodiment of the respective colors of the colored parts is not especially limited, and it can be appropriately determined.

"Ink Intrusion Test"
In order to test whether or not the contact hole can be formed inside the coupling opening by utilizing a surface tension of the ink, an ink intrusion test was performed using a BM test pattern. Results of the test are shown below. FIG. 5 is a front (planar) view schematically showing the BM test pattern for the ink intrusion test.

According to the BM test pattern 60, as shown in FIG. 5, a partition (BM) 31 was arranged in such a way that an opening 33 where a colored part is to be arranged and a projection 61 which is to be a contact hole were formed. The opening 33 had a width Wa of about 45 μm. The projection 61 had a width Wb of about 10 μm or about 20 μm. When the projection 61 had a width Wb of about 10 μm, the length La of the projection 61 was 30 μm. When the projection 61 had a width Wb of about 20 μm, the length La of the projection 61 was also 30 μm.

The BM test pattern 60 was formed in the following manner. On a glass substrate, a shielding resin film (having a thickness of about 1500 nm) having both of UV curing property and thermosetting property was laminated as a material for the partition under heating at about 100° C. Then, the resin film was irradiated with UV whose wavelength range includes 365 nm at about 50 mJ/cm$^2$ (detection wavelength of 365 nm) through a photomask. Then, the film was pattern-formed by development. Then, the film was baked for about 1 hour at 220° C., thereby forming the BM test pattern 60. A photosensitive and shielding liquid resin material may be used as the material for the partition, in addition to the above-mentioned photosensitive and shielding resin film. Then, under atmosphere of a fluorine atom-containing gas, the partition pattern was provided with ink repellency by being irradiated with plasma with a vacuum dry etching apparatus. The plasma was radiated under the following conditions.

Introduced gas: CF$_4$/He=150 to 300/0 to 500 sccm
Gas pressure: 50 to 150 mTorr
Electric power: 200 to 300 W
Treatment time: 10 to 40 sec
Treatment temperature: 40° C.

The conditions for the plasma radiation are not especially limited to these conditions, and appropriate conditions may be adopted. In the present evaluation test, the vacuum dry etching apparatus was used but an atmospheric plasma apparatus, and the like, may be used.

The ink intrusion test was performed as follows. The ink was injected into the opening 33 with an ink-jet apparatus, and then, the solvent was removed and the ink was dried. Then, a length Lb of the ink intrusion in each pattern was measured.

Table 1 shows results of the ink intrusion test. The length Lb of the ink intrusion varied depending on the injection conditions (the injection amount, the injection position, the number of times of the injection, and the like). However, the variation can be reduced by optimizing the injection conditions. Table 1 shows the minimum value of the length of the ink intrusion. The ink intrusion ratio was calculated based on Lb/La×100.

TABLE 1

| Width Wb of projection (μm) | Length Lb of ink intrusion (μm) | Ink intrusion ratio (%) |
| --- | --- | --- |
| 10 | 2 | 7 |
| 20 | 5 | 17 |

This result shows that even if the width Wb of the projection 61 is about 20 μm, the effect of preventing the ink intrusion is exhibited. The ink intrusion ratio gradually increases as the width Wb of the projection 61 increases. In the pattern having the projection 61, as shown in FIG. 5, a distance Lc from the top of the projection 61 to an adjacent pixel needs to be about 10 μm in view of resolution of the material for partition. Accordingly, if the length Ld of the contact hole is 5 μm, for example, the partition 31 at a part where the projection 61 is formed needs to have a width We of about 17 μm on the basis of Lb+Lc+Ld=2+5+10 when the width Wb of the projection 61 is about 10 μm, and the width We needs to be about 20 μm on the basis of Lb+Lc+Ld=5+5+10 when the width Wb of the projection 61 is about 20 μm.

In view of the results of this in intrusion test, a width We of the partition 31 at the part where the coupling opening 34 is formed can be calculated as follows, in the partition pattern where the coupling opening 34 is formed, shown in FIG. 6 of the present invention. In the case that the length Ld of the contact hole is 5 μm, similarly, the width We of the partition 31 at the part where the coupling opening 34 is formed needs to be about 9 μm, on the basis of Lb×2+Ld=2×2+5 when the width Nd of the coupling opening 34 is about 10 μm. When the width Wd of the coupling opening 34 is about 20 μm, the width We needs to be about 15 μm, on the basis of Lb×2+Ld=5×2+5. Accordingly, comparison between the partition pattern where the projection is formed and the partition pattern where the coupling opening is formed shows that the latter pattern can more decrease the width of the partition, and therefore, the aperture ratio can be more increased. It is also found that the width of the coupling opening is preferably about 20 μm or less and more preferably about 10 μm or less.

Embodiment 2

A liquid crystal display device in accordance with Embodiment 2 is mentioned. The same contents as in Embodiment 1 are omitted. Further, components exhibiting the same function are expressed by the same reference numeral. FIG. 7 is a schematic view showing a liquid crystal display device in accordance with Embodiment 2. FIG. 7(*a*) is a front (planar) view. FIG. 7(*b*) is across sectional view taken along line X2-Y2 in FIG. 7(*a*).

The liquid crystal display device 200 of the present Embodiment has the following structure as viewed in the front direction, as shown in FIG. 7. A coupling opening 34 is positioned near a switching element 20. Openings 33 in pixels adjacent in the horizontal direction are coupled with each other. Similarly to Embodiment 1, this structure makes it possible to form a contact hole by utilizing a surface tension of the ink and to improve the aperture ratio. A gate wiring 12 includes a projection 12*a*, and the projection 12*a* is arranged to cover a region where a partition 31 is not formed between a source wiring 13 and a drain electrode 22. As a result, generation of light leakage in the coupling opening 34 can be suppressed.

Embodiment 3

A liquid crystal display device in accordance with Embodiment 3 is mentioned. The same contents as in Embodiment 1 are omitted. Further, components exhibiting the same function are expressed by the same reference numeral. FIG. 8 is a schematic view showing the liquid crystal display device in Embodiment 3. FIG. 8(*a*) is a front (planar) view. FIG. 8(*b*) is a cross sectional view taken along line X3 to Y3 in FIG. 8(*a*). FIG. 8(*c*) is a cross-sectional view taken along line X4 to Y4 in FIG. 8(*a*).

A liquid crystal display device 300 in the present Embodiment has the following structure as viewed in the front direction, as shown in FIG. 8. A coupling opening 34 is positioned near a switching element 20. Openings 33 in pixels adjacent in the vertical direction are coupled with each other. Similarly to Embodiment 1, this structure makes it possible to form a contact hole by utilizing a surface tension of the ink and to improve the aperture ratio. Further, in order to prevent generation of light leakage from a region where a partition 31 is not formed (a region inside the coupling opening 34) between a gate wiring 12 and a drain electrode 22, the drain electrode 22 is arranged to overlap with the gate wiring 12 in the region inside the coupling opening 34. According to the present Embodiment, a capacitance electrode 18 is formed above the gate wiring 12. The gate wiring 12 also functions as an electrode constituting a storage capacitance Cs. That is, the liquid crystal display device 300 has a so-called Cs on Gate type storage capacitance.

Embodiment 4

A liquid crystal display device in Embodiment 4 is mentioned. The same contents as in Embodiment 1 are omitted. Further, components exhibiting the same function are expressed by the same reference numeral. FIG. 9 is a front (planar) view schematically showing a liquid crystal display device in Embodiment 4.

According to a liquid crystal display device 400 in the present Embodiment, as shown in FIG. 9, a partition 31 is formed to have a bent opening 35. The bent opening 35 is connected to an opening 33b and has a substantially L shape as viewed in plane. This structure makes it possible to more effectively suppress the ink intrusion in the colored part-forming step, and further an area of a contact hole 17 can be increased. Accordingly, generation of connection defects can be suppressed between a pixel electrode 15 and a switching element 20.

The shape of the bent opening 35 is not especially limited. In view of resolution of the material for the partition, the bent opening 35 preferably has a substantially L shape as viewed in plane or a T shape as viewed in plane, as shown in FIG. 10(a). The bent opening 35 may be connected to the opening 33a, as shown in FIGS. 10(b) and 10(c).

The bent opening 35 may be arranged to have a substantially step shape as viewed in plane and couple an opening 33a with an opening 33b, as shown in FIG. 11(a). The shape of the bent opening 35 is not especially limited in the embodiment in which the opening 33a is coupled with the opening 33b through the bent opening 35. However, in view of resolution of the material for partition, the bent opening 35 preferably has a substantially step shape, a substantially cross shape shown in FIG. 11(b), or a substantially T shape shown in FIG. 11(c) as viewed in plane.

Embodiment 5

A liquid crystal display device in Embodiment 5 is mentioned. The same contents as in Embodiments 1 and 4 are omitted. Further, components exhibiting the same function are expressed by the same reference numeral. FIG. 12 is a front (planar) view schematically showing the liquid crystal display device in Embodiment 5.

According to a liquid crystal display device 500 of the present Embodiment, as shown in FIG. 12, a partition 31 is arranged to have a bent opening 35 near a switching element. The bent opening 35 is connected to an opening 33 and has a substantially L shape as viewed in plane. As a result, connection defects generated between a pixel electrode 15 and a switching element 20 can be suppressed, similarly to Embodiment 4.

The shape of the bent opening 35 is not especially limited. However, in view of resolution of the material for partition, the bent opening 35 preferably has a substantially L shape, or a substantially T shape shown in FIGS. 13(a) and 13(b) as viewed in plane. The bent opening 35 having a substantially L shape as viewed in plane may be arranged in accordance with an embodiment shown in FIG. 13(c).

Embodiment 6

A liquid crystal display device in Embodiment 6 is mentioned. The same contents as in Embodiments 1 and 4 are omitted. Further, components exhibiting the same function are expressed by the same reference numeral. FIG. 14 is a front (planar) view schematically showing the liquid crystal display device in Embodiment 6.

A liquid crystal display device 600 in the present Embodiment has the following structure as viewed in the front direction, as shown in FIG. 14. A coupling opening 35 is positioned near a switching element 20 and has a substantially step shape as viewed in plane. The coupling opening 35 couples openings 33 in pixels adjacent in the vertical direction with each other. According to such a structure, similarly to Embodiment 4, generation of connection defects can be suppressed between a pixel electrode 15 and a switching element 20.

The shape of the bent opening 35 is not especially limited. However, in view of resolution of the material for partition, the bent opening 35 preferably has a substantially step shape, a substantially cross shape shown in FIG. 15(a), or a substantially T shape shown in FIG. 15(b) as viewed in plane.

The liquid crystal display device 600 may have the following structure as viewed in the front direction, as shown in FIGS. 16(a) and (b). The openings 33 in pixels adjacent in the horizontal direction are coupled with each other through the bent opening 35.

The present application claims priority under the Paris Convention and the domestic law in the country to be entered into national phase on Patent Application No. 2006-253534 filed in Japan on Sep. 19, 2006, the entire contents of which are hereby incorporated by reference.

The terms "or more" and "or less" in the present description means that the value described (boundary value) is included.

BRIEF DESCRIPTION OF DRAWINGS

FIG. 1(a) is a planar view. FIG. 1(b) is a cross-sectional view taken along line X1-Y1 in FIG. 1(a).

FIG. 3(a) is the partition in accordance with Comparative Embodiment 1. FIG. 3(b) is the partition in accordance with Comparative Embodiment 2.

FIG. 7(a) is a front (planar) view. FIG. 7(b) is a cross-sectional view taken along line X-2 to Y2 in FIG. 7(a).

FIG. 3(a) is a front (planar) view. FIG. 8(b) is a cross-sectional view taken along line X3-Y3 in FIG. 8(a). FIG. 8(c) is a cross-sectional view taken along line X4-Y4 in FIG. 8(a).

EXPLANATION OF NUMERALS AND SYMBOLS

Figure 1:
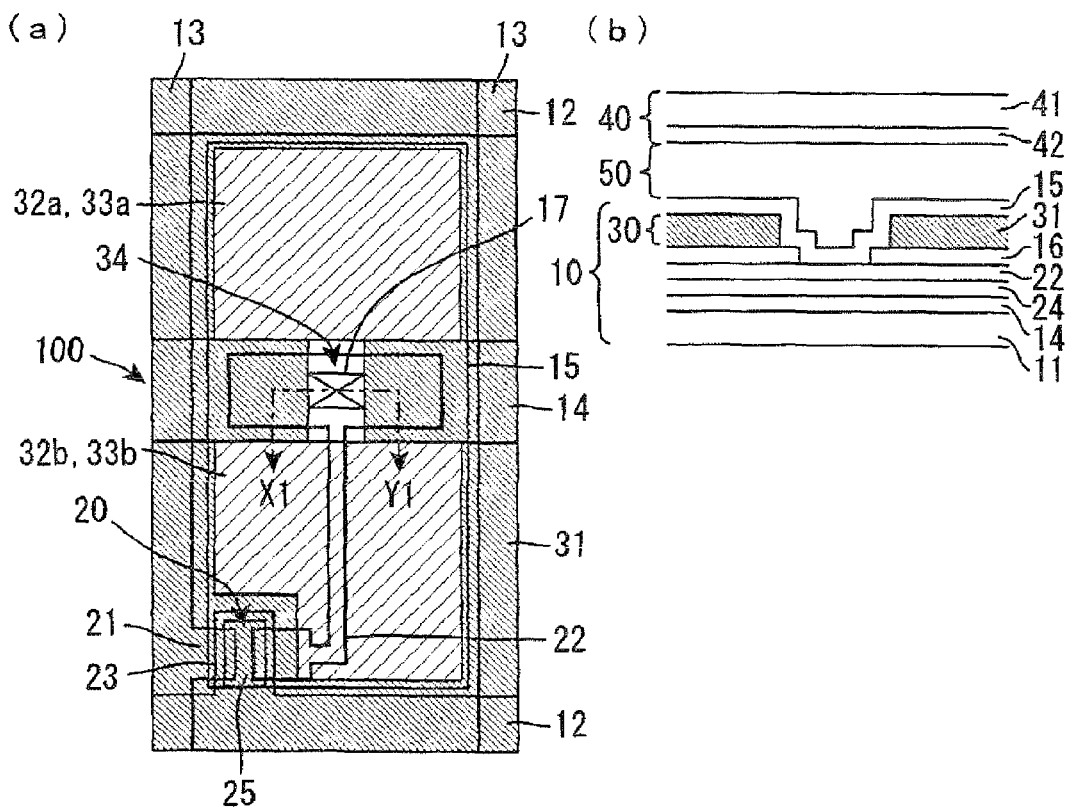
FIG. 1 is a schematic view showing the liquid crystal display device in accordance with Embodiment 1.
Figure 2:
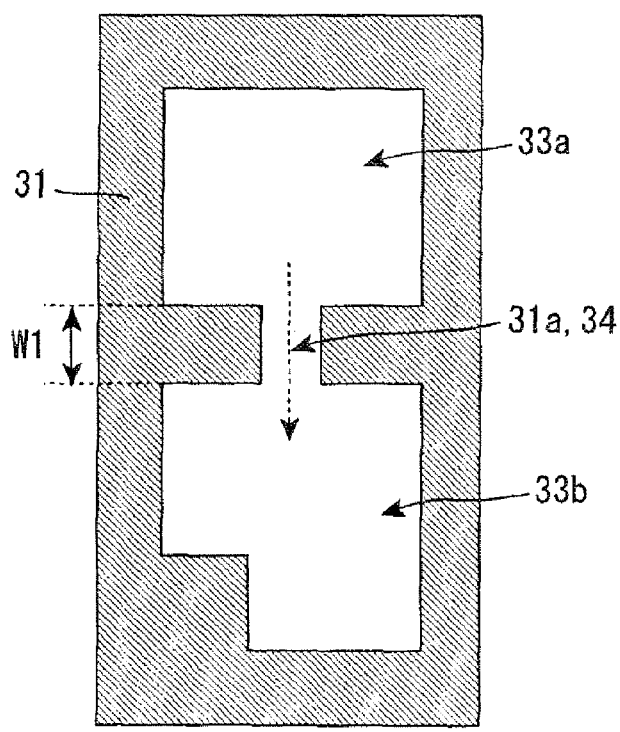
FIG. 2 is a front (planar) view schematically showing an arrangement embodiment of the partition in accordance with Embodiment 1.
Figure 3:
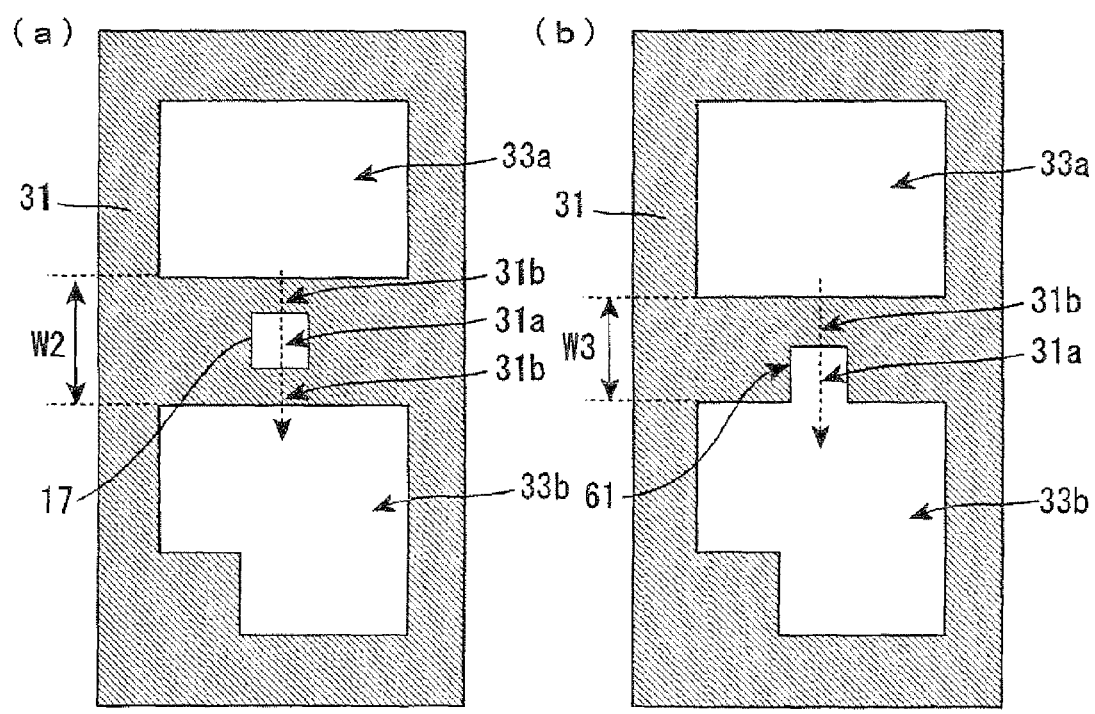
FIG. 3 is a front (planar) view schematically showing an arrangement embodiment of the partition in accordance with Comparative Embodiments.
Figure 4:
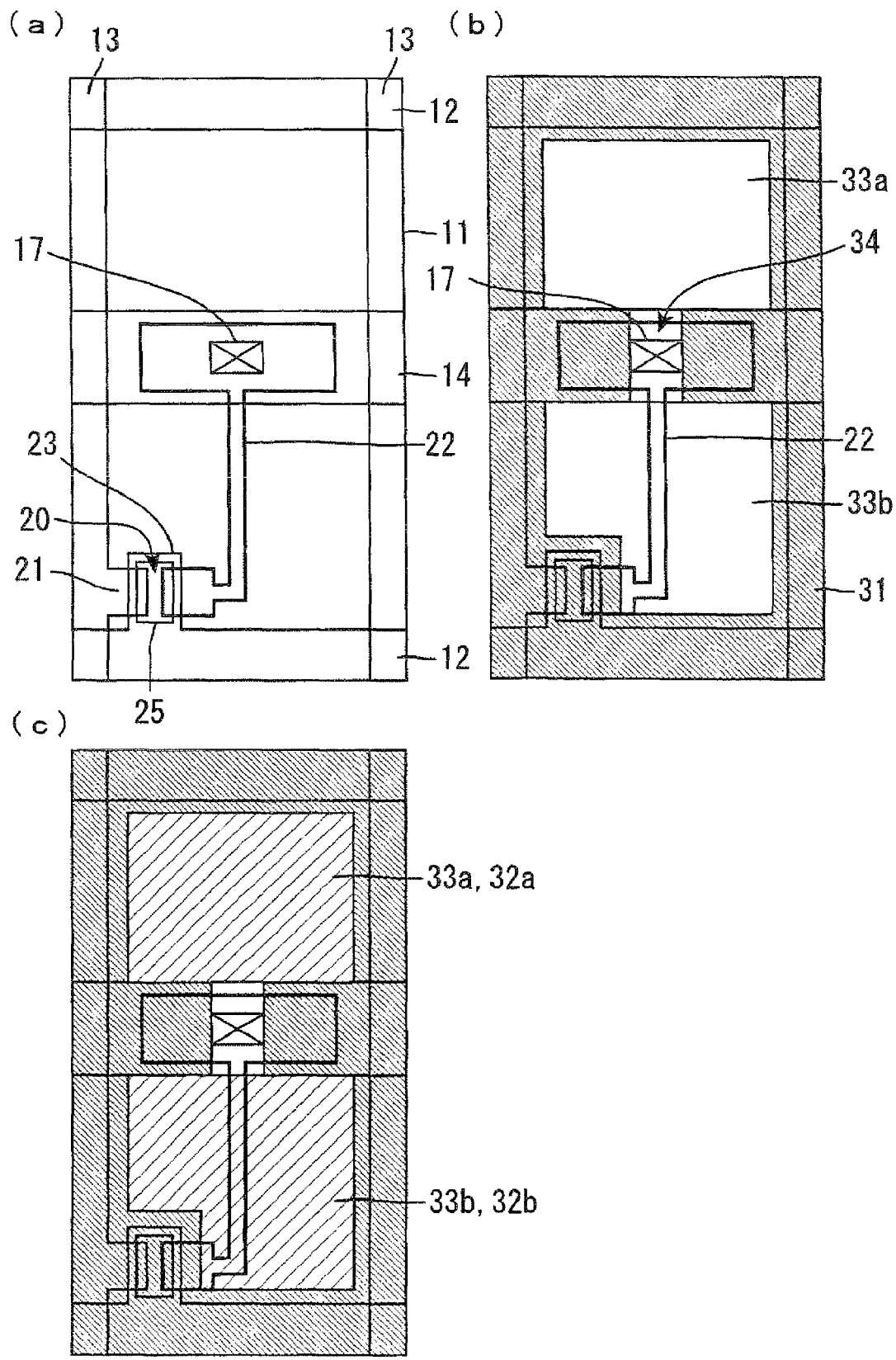
FIGS. 4(a) to 4(c) are front (planar) views schematically showing the liquid crystal device in accordance with Embodiment 1, and show production processes of the device.
Figure 5:
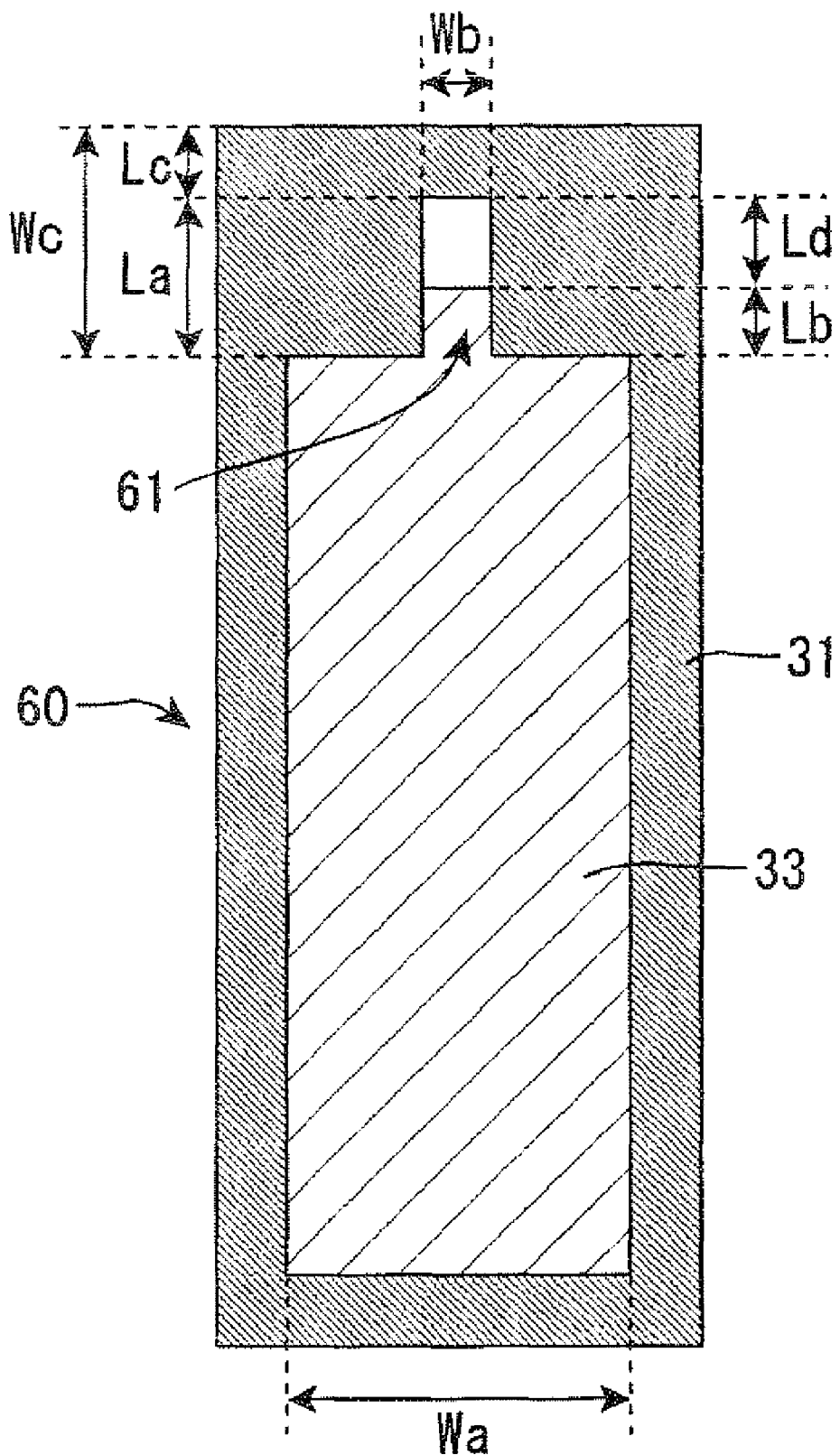
FIG. 5 is a front (planar) view schematically showing the BM test pattern for the ink intrusion test.
Figure 6:
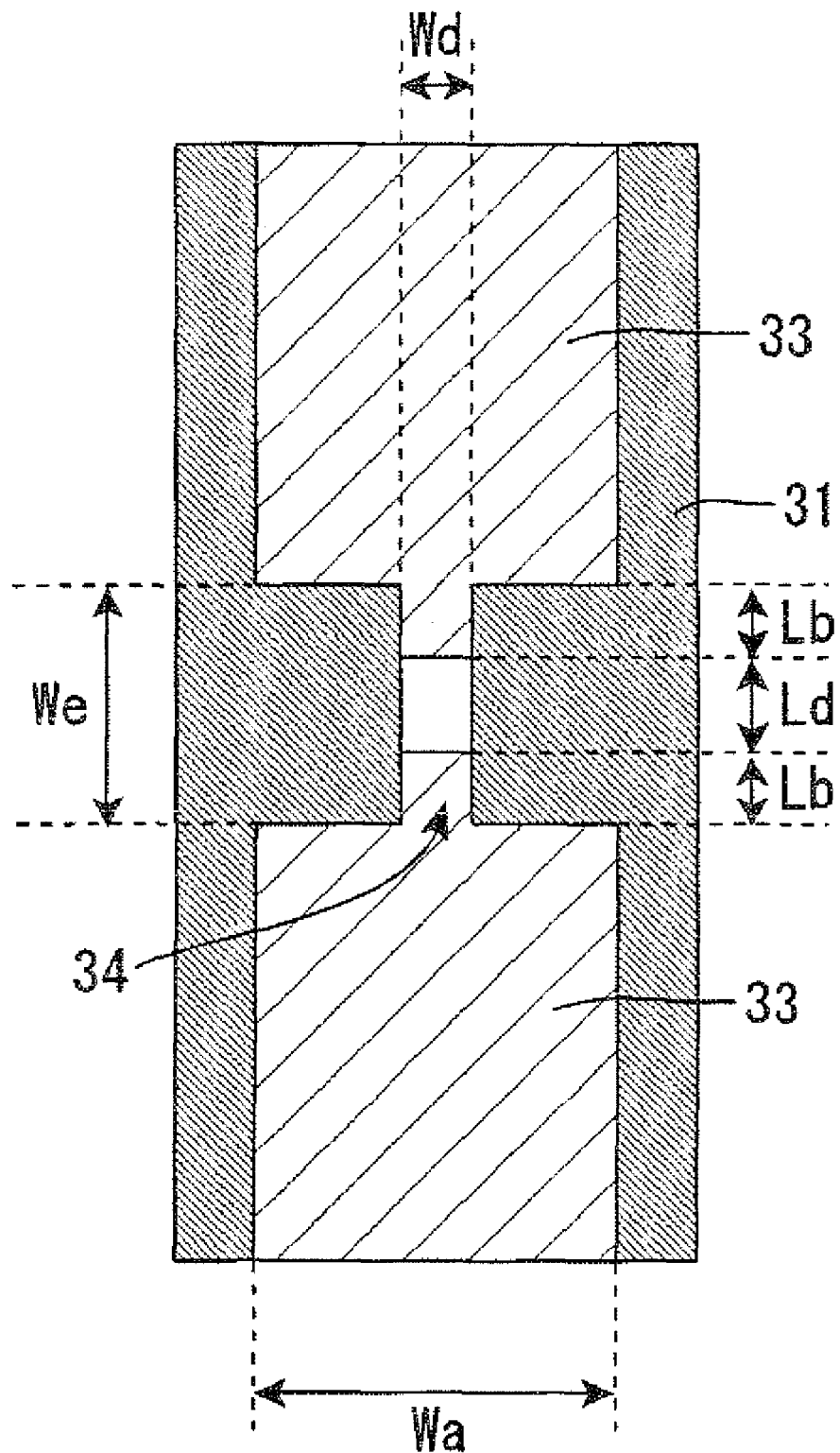
FIG. 6 is a front (planar) view schematically showing the partition pattern where the coupling opening is formed of the present invention.
Figure 7:
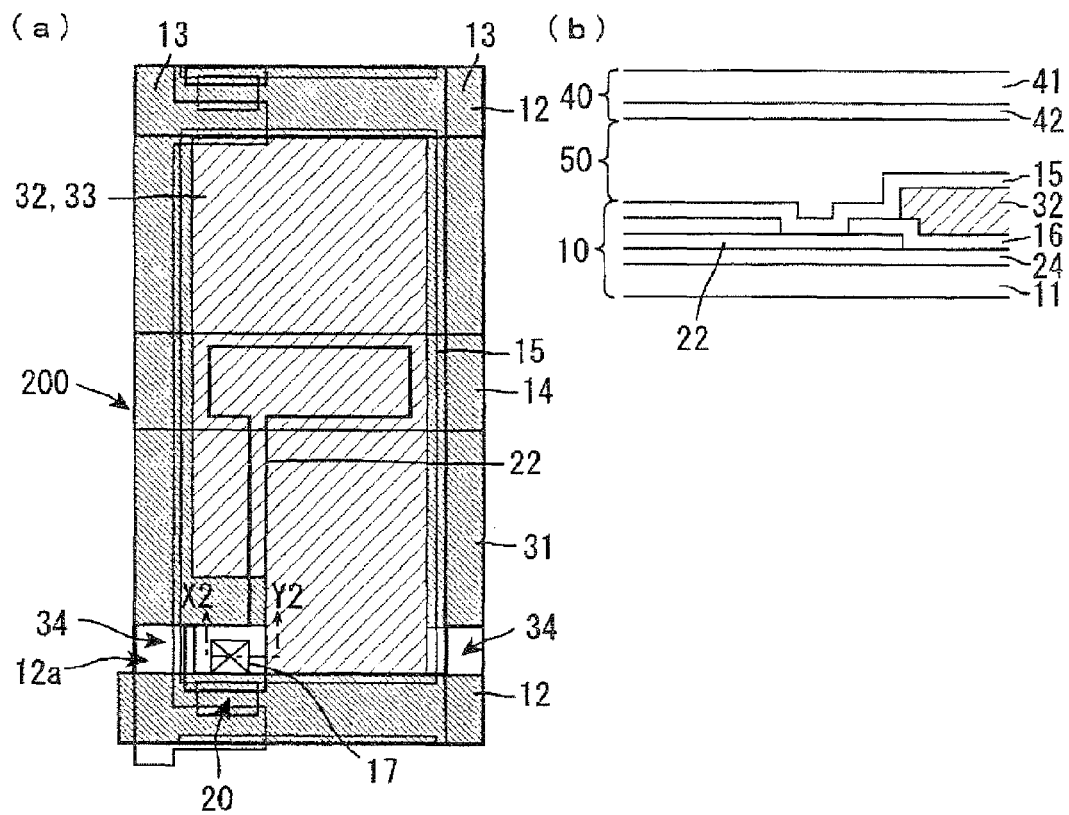
FIG. 7 is a schematic view showing the liquid crystal display device in accordance with Embodiment 2.
Figure 8:
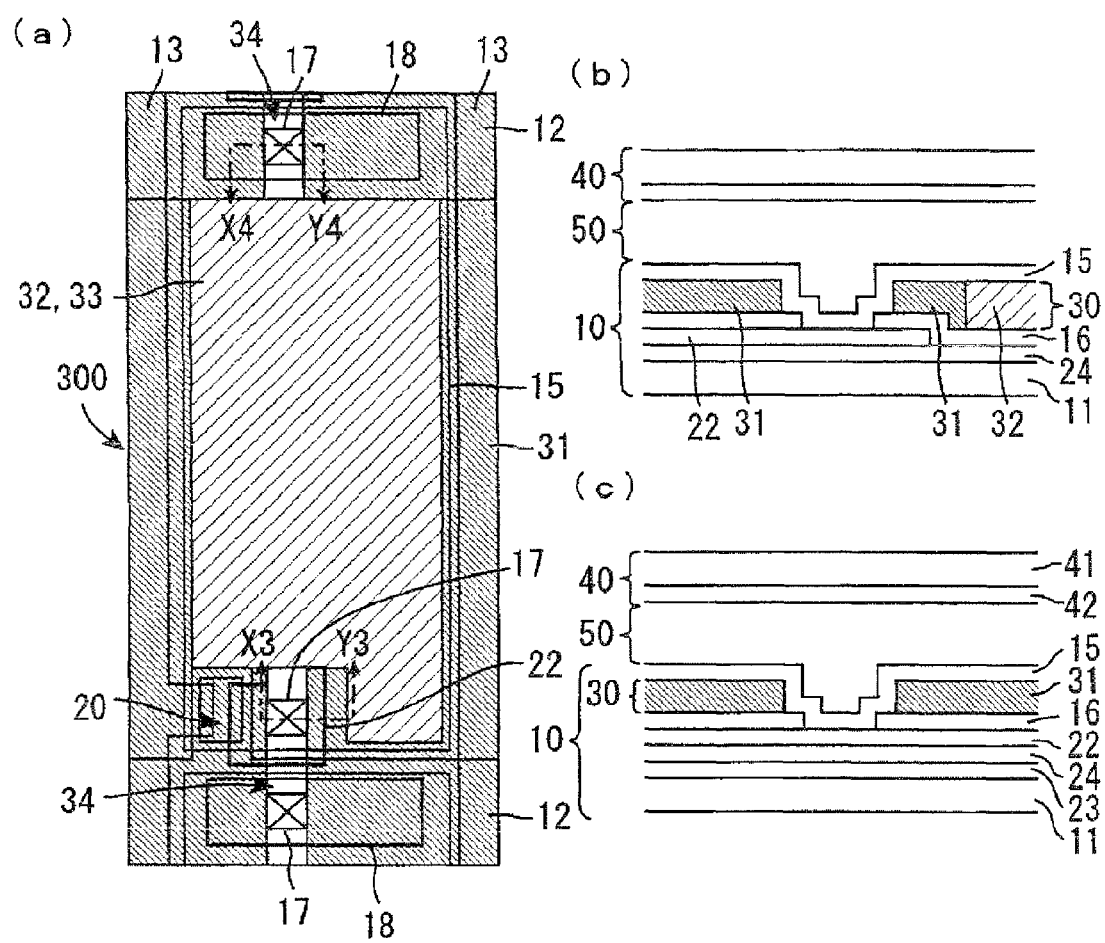
FIG. 8 is a schematic view showing the liquid crystal display device in accordance with Embodiment 3.
Figure 9:
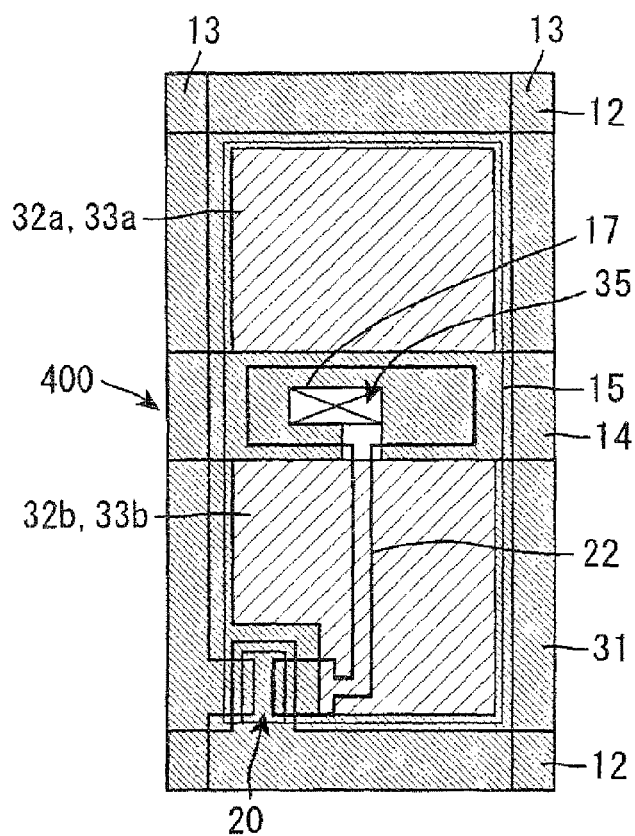
FIG. 9 is a front (planar) view schematically showing the liquid crystal display device in accordance with Embodiment 4.
Figure 10:
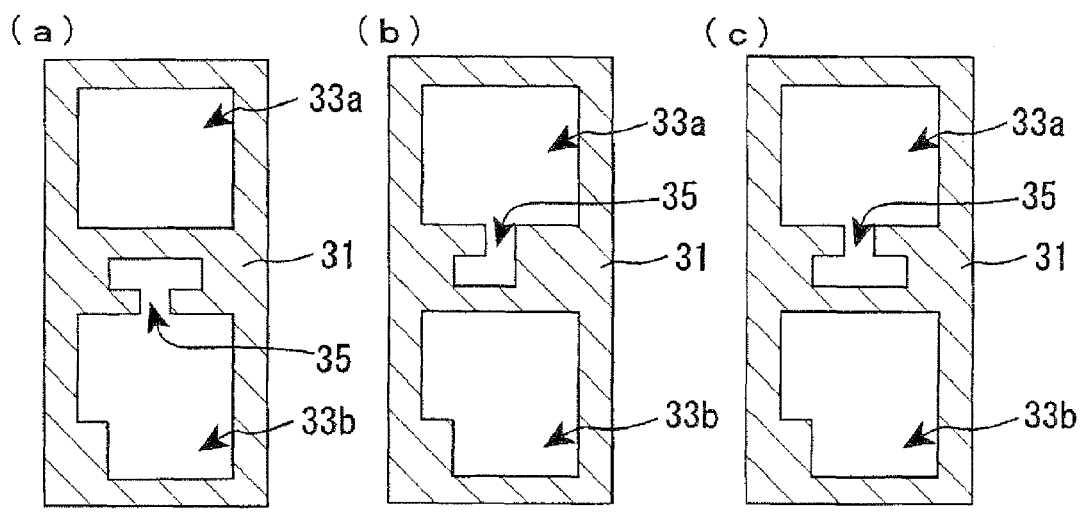
FIGS. 10(a) to 10(c) are front (planar) views each schematically showing a modified embodiment of the liquid crystal display device in accordance with Embodiment 4.
Figure 11:
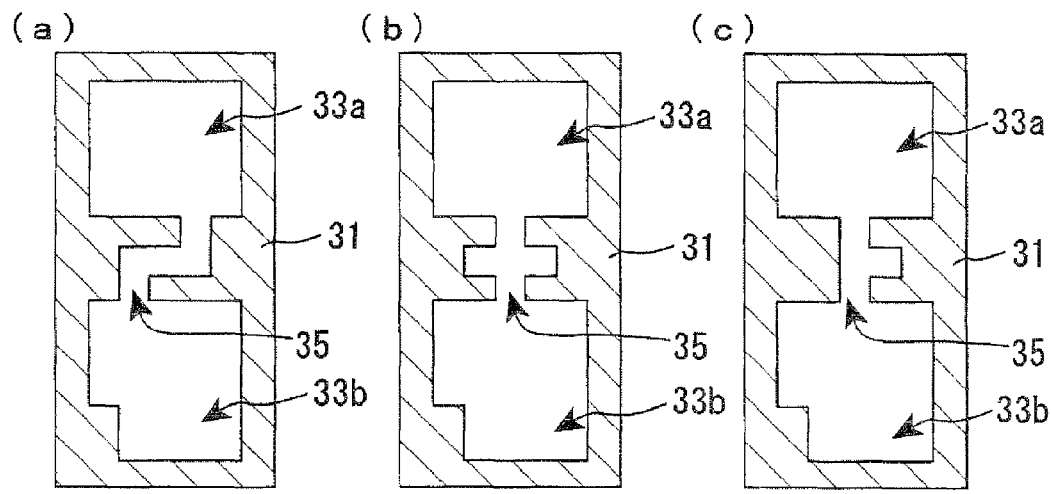
FIGS. 11(a) to 11(c) are front (planar) views each schematically showing a modified embodiment of the liquid crystal display device in accordance with Embodiment 4.
Figure 12:
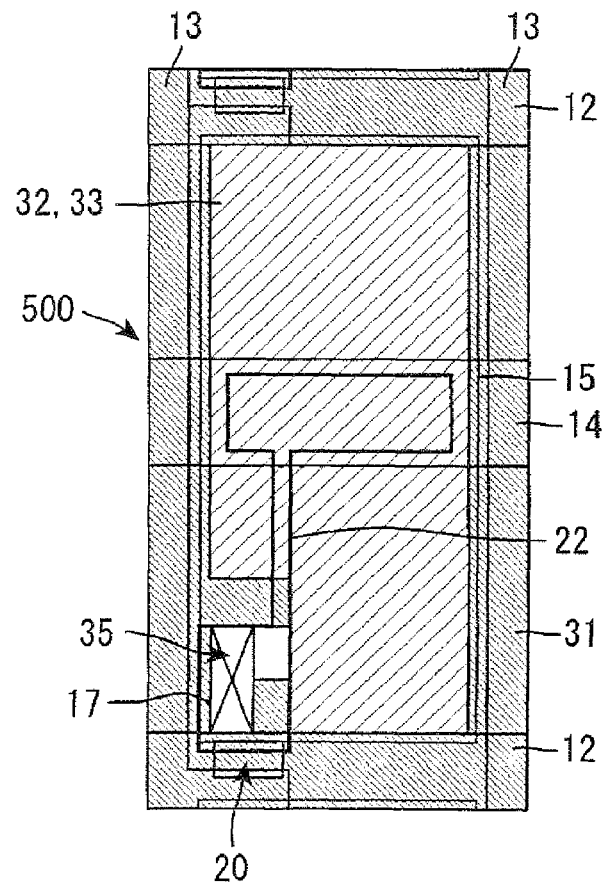
FIG. 12 is a front (planar) view schematically showing the liquid crystal display device in accordance with Embodiment 5.
Figure 13:
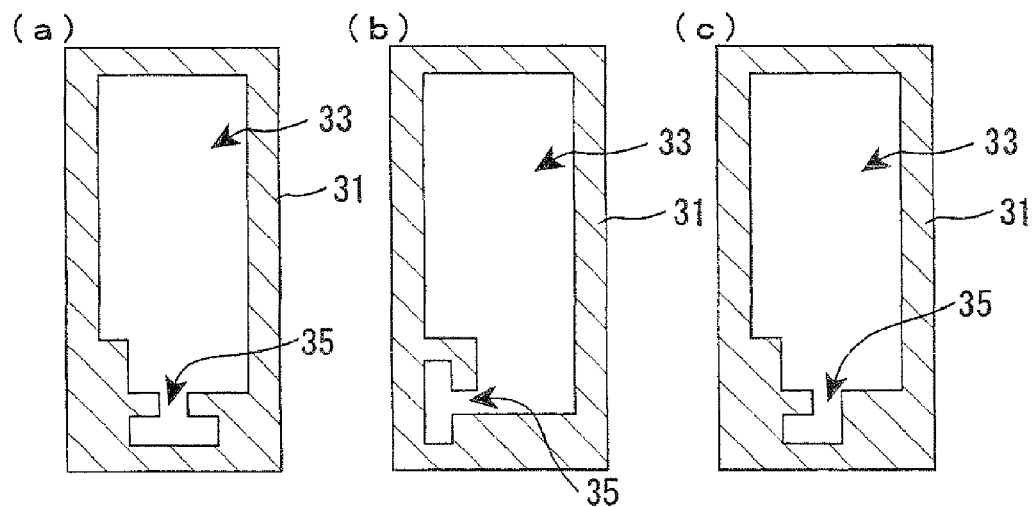
FIGS. 13(a) to 13(c) are schematic front (planar) views each showing a modified embodiment of the liquid crystal display device in accordance with Embodiment 5.
Figure 14:
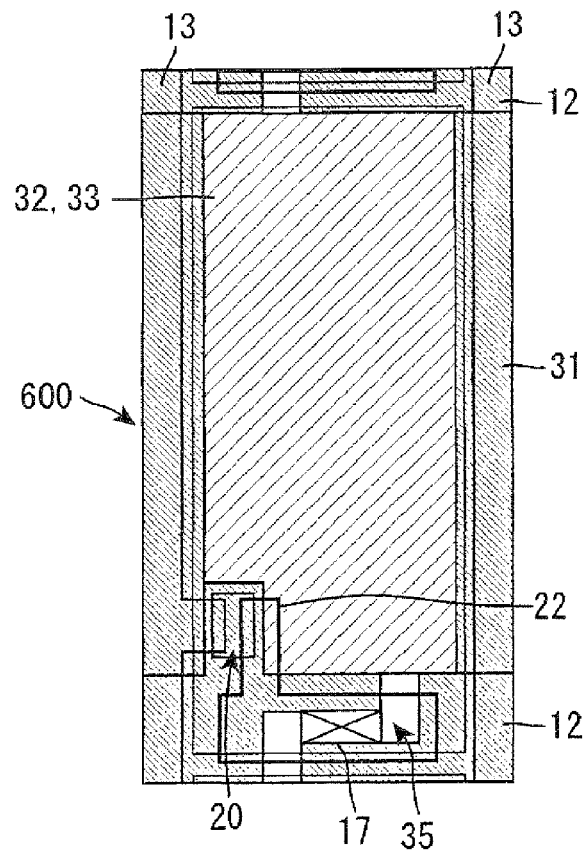
FIG. 14 is a schematic front (planar) view showing the liquid crystal display device in accordance with Embodiment 6.
Figure 15:
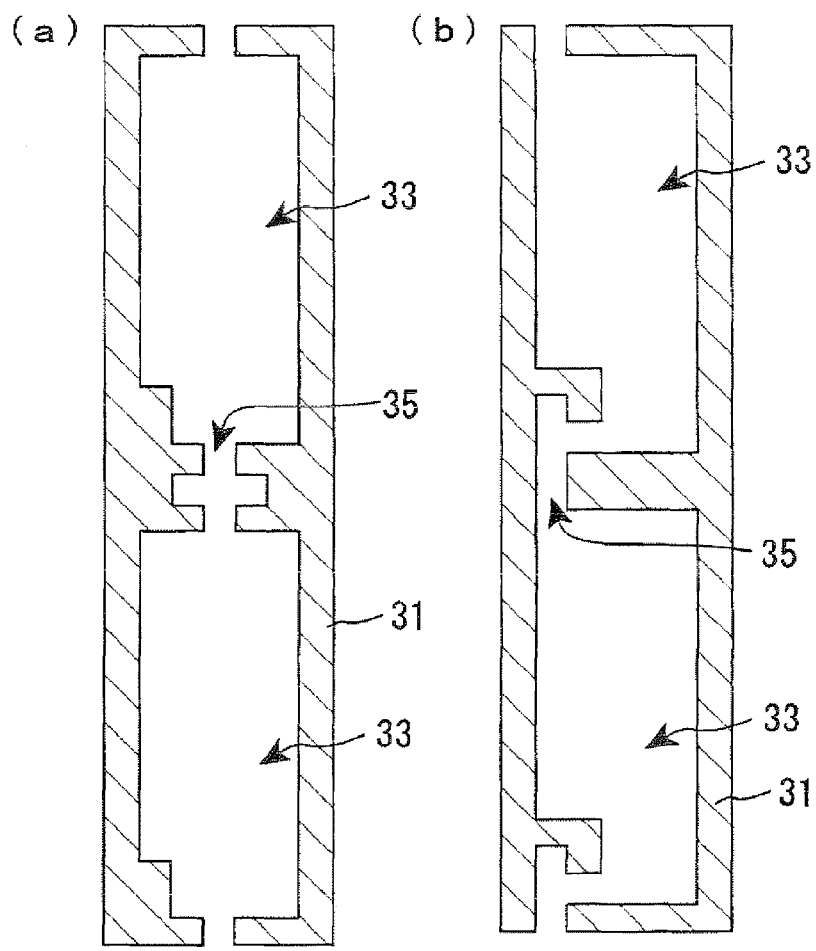
FIGS. 15(a) and (b) are front (planar) views each schematically showing a modified embodiment of the liquid crystal display device in accordance with Embodiment 5.
Figure 16:
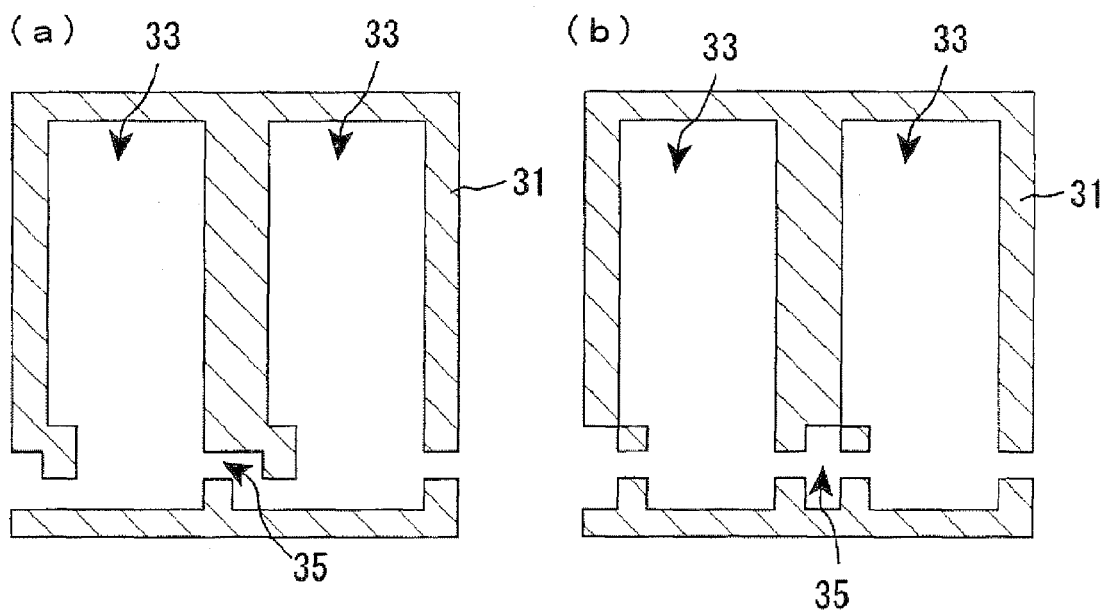
FIGS. 16(a) and (b) are front (planar) views each schematically showing a modified embodiment of the liquid crystal display device in accordance with Embodiment 6.

10: Active matrix substrate (the first substrate)
11, 41: Insulating substrate
12: Gate wiring
12a: Projection
13: Source wiring
14: Capacitance wiring
15: Pixel electrode
16: Insulating film
17: Contact hole
18: Capacitance electrode
20: Switching element (TFT)
21: Source electrode
22: Drain electrode
23: Gate electrode
24: Gate insulating film
25: Semiconductor thin film
30: Color filter layer
31: Partition (in figures, a region marked with a downward-sloping line)
31a: Partition-removed part
31b: Partition-remaining part
32, 32a, 32b: Colored part (in figures, a region marked with a upward-sloping line)
33, 33a, 33b: Opening
34: Coupling opening
35: Bent opening
40: Opposite substrate (the second substrate)
42: Common electrode
50: Liquid crystal layer
60: BM test pattern
61: Projection
100, 200, 300, 400, 500, 600: Liquid crystal display device
W1, W2, W3: Width of partition
Wa: Width of opening
Wb: Width of projection
Wc: Width of partition at the part where the projection is formed
Wd: Width of coupling opening
We: Width of partition at the part where the coupling opening is formed
La: Length of projection
Lb: Length of ink intrusion
Lc: Distance from top of projection to adjacent pixel
Ld: Length of contact hole

The invention claimed is:

1. A liquid crystal display device comprising a first substrate, a second substrate, and a liquid crystal layer interposed between the first and second substrates,
   the first substrate having a structure in which a lower conductive part, a color filter layer, an upper conductive part are stacked in this order on an insulating substrate,
   wherein the color filter layer includes a colored part and a partition for partitioning the colored part,
   the partition is formed in such a way that a plurality of openings and a coupling opening are formed,
   the colored part being arranged in the plurality of openings,
   the coupling opening linearly coupling the plurality of openings with each other, and
   the upper conductive part is connected to the lower conductive part through a contact hole,
   the contact hole being formed in a region overlapping with the coupling opening.

2. The liquid crystal display device according to claim 1, wherein the coupling opening has a square shape as viewed in plane.

3. The liquid crystal display device according to claim 1, wherein the coupling opening couples openings in adjacent pixels with each other.

4. The liquid crystal display device according to claim 1, wherein the partition is formed in such a way that a plurality of openings in one pixel are formed, and
   the coupling opening couples at least two of the plurality of openings in one pixel with each other.

5. The liquid crystal display device according to claim 1, wherein the coupling opening has a width of 20 μm or less at a boundary between the coupling opening and the opening.

6. The liquid crystal display device according to claim 1, wherein the coupling opening is arranged to overlap with a shielding member formed on the first substrate.

7. The liquid crystal display device according to claim 1, wherein the colored part is formed of a nonphotosensitive material.

8. A liquid crystal display device comprising a first substrate, a second substrate, and a liquid crystal layer interposed between the first and second substrates,
   the first substrate having a structure in which a lower conductive part, a color filter layer, an upper conductive part are stacked in this order on an insulating substrate,
   wherein the color filter layer includes a colored part and a partition for partitioning the colored part,
   the partition is formed in such a way that an opening and a bent opening are formed,
   the colored part being formed in the opening,
   the bent opening being connected to the opening, and
   the upper conductive part is connected to the lower conductive part through a contact hole,
   the contact hole being formed in a region overlapping with the bent opening.

9. The liquid crystal display device according to claim 8, wherein the bent opening is connected to one opening, and the bent opening has an L shape or T shape as viewed in plane.

10. The liquid crystal display device according to claim 8, wherein the partition is formed in such a way that a plurality of openings in one pixel are formed, and
    the bent opening couples at least two of the plurality of openings in one pixel with each other.

11. The liquid crystal display device according to claim 8, wherein the bent opening couples openings in adjacent pixels with each other.

12. The liquid crystal display device according to claim 10, wherein the bent opening has a step shape, cross shape or T shape as viewed in plane.

13. The liquid crystal display device according to claim 8, wherein the bent opening has a width of 20 µm or less at a boundary between the bent opening and the opening.

14. The liquid crystal display device according to claim 8, wherein the bent opening is arranged to overlap with a shielding member formed on the first substrate.

15. The liquid crystal display device according to claim 8, wherein the colored part is formed of a nonphotosensitive material.

* * * * *